INVENTOR.
HANS K. JENNY
BY
ATTORNEY

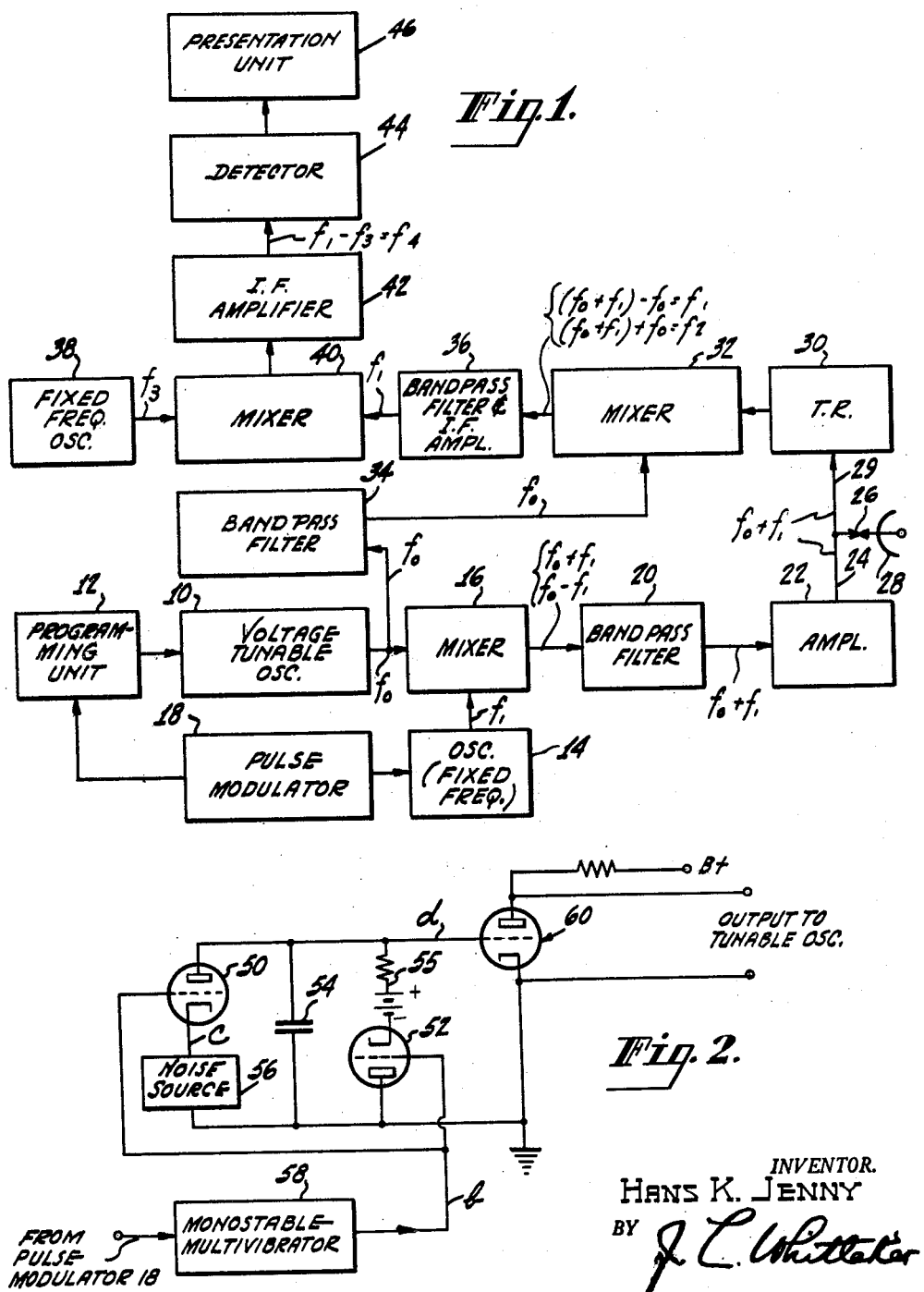

Dec. 29, 1964  H. K. JENNY  3,163,862
RADAR SYSTEM AND COMPONENT APPARATUS
Filed Nov. 9, 1955  3 Sheets-Sheet 3

INVENTOR.
HANS K. JENNY
BY J. C. Whittaker
ATTORNEY

3,163,862
RADAR SYSTEM AND COMPONENT APPARATUS
Hans K. Jenny, Whippany, N.J., assignor to Radio Corporation of America, a corporation of Delaware
Filed Nov. 9, 1955, Ser. No. 545,951
22 Claims. (Cl. 343—17.1)

The present invention relates generally to improved radar systems, and more particularly to improved radar systems and components providing variable or random frequency operation.

An object of the invention is to provide an improved radar system which cannot easily be jammed.

Another object is to provide an improved electrical storage apparatus including improved charging and discharging means.

The system of this invention includes means for radiating carrier frequency pulses and for receiving and indicating the pulses and/or the transit times thereof, after reflection from reflecting objects. The carrier frequency is maintained constant during the pulse intervals but varied, preferably in a random manner, and to a relatively large extent, from pulse-to-pulse.

In a preferred form of the invention, an oscillator is employed which is common both to the transmission and reception channels of the radar. Its frequency is first beat against a second frequency to obtain a sum frequency which is transmitted to targets and then beat against the frequency of received echoes to obtain a difference frequency which may be applied to an indicating means. The oscillator is preferably one of the voltage tunable type, such as a voltage tunable magnetron. Its frequency is maintained at a fixed value during the interval between the transmission of energy to targets and the reception of echoes from said targets. It is then varied to a new fixed frequency substantially widely spaced from the first fixed frequency. A way of doing this, according to the invention, is to employ a storage capacitor as the oscillator tuning voltage source. During the intervals it is desired to maintain the oscillator frequency at a fixed value, the charge and discharge paths of the storage capacitor are opened, whereby the frequency output of the oscillator, which is a function of the voltage across the capacitor, cannot change. The charge on the capacitor is then varied in either a predetermined or random manner until the next pulse is transmitted. This may be accomplished by closing the capacity charge and discharge paths and placing in the charge paths a generator which operates according to a fixed law in the first case, or one which operates in a random manner in the second case. The frequency at which the next pulse is transmitted is dependent on the voltage across the capacitor at the time the capacitor charge and discharge paths are again opened.

The invention will be described in greater detail by reference to the following description taken in connection with the accompanying drawing in which:

FIGURE 1 is a block circuit diagram of the preferred form of the present invention;

FIGURE 2 is a schematic circuit diagram of a programming unit suitable for use in the circuit of FIGURE 1;

Throughout the drawing, similar reference numerals are applied to similar parts.

Figure 3:
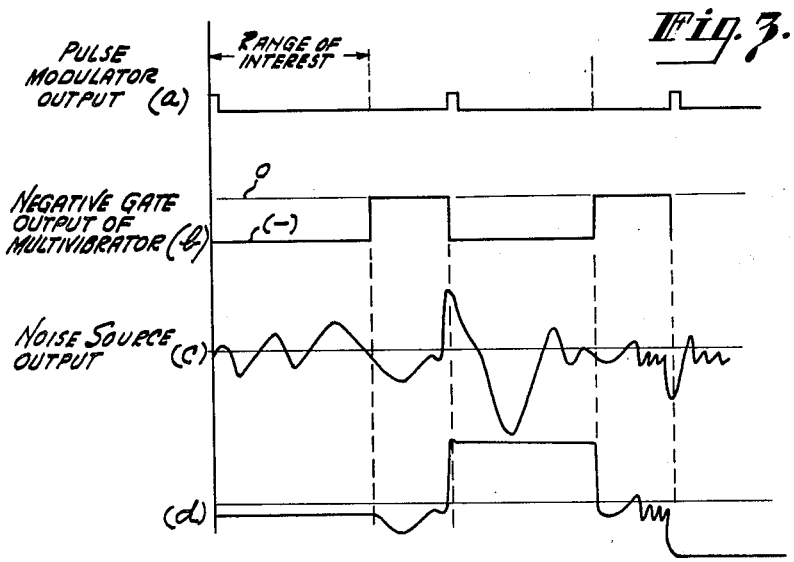
FIGURE 3 is a drawing of wave forms present at various parts of the circuit of FIGURE 2.

Referring to FIGURE 1, the voltage tunable oscillator 10 may comprise a voltage tunable magnetron, backward-wave oscillator or the like. The voltage supplied to the voltage tunable oscillator by programming unit 12 determines the output frequency of the oscillator. The output of oscillator 10 is mixed with that of oscillator 14 in mixer unit 16. The voltage supplied to the tunable oscillator 10 by the programming unit remains constant for a duration of time equivalent to the entire radar range of interest, whereby the output frequency $f_0$ of the oscillator also remains constant for this entire interval.

Mixer 16 must be broad banded and may comprise a travelling wave tube amplifier. Oscillator 14 is pulsed by modulator unit 18 which may, for example, include a source of sinusoidal signals and a means for converting such signals into pulses such as a phantastron or the like. Other types of modulators equally well known in the art including ones for producing pulses at a non-synchronous or unpredictable rate may, of course, be used instead. The output frequency $f_1$ of oscillator 14 is mixed with the frequency $f_0$ of oscillator 10 to provide output frequencies of $(f_0+f_1)$ and $(f_0-f_1)$. Bandpass filter 20 passes frequency $(f_0+f_1)$ but eliminates frequency $(f_0-f_1)$. The output pulses of filter 20 having a carrier frequency $(f_0+f_1)$ are amplified in amplifier stage 22 and applied by leads 24 and 26 to antenna 28. The latter may comprise any one of a number of different directive radiating means such as, for example, a parabolic reflector fed by a dipole, feed horn, or the like.

The pulses radiated from antenna 28 which strike reflecting objects and are reflected back to the antenna are applied over leads 26 and 29 through transmit-receive device 30 to mixer 32. The output of the voltage tunable oscillator 10 is applied via bandpass filter 34 to mixer 32 whereby the output frequencies of the mixer will be $(f_0+f_1)-f_0=f_1$, and $(f_0+f_1)+f_1=f_2$. As the voltage output of tunable oscillator 10 remains constant during the interval between the transmission of a pulse and the reception of an echo from the furthest target of interest, the output difference frequency $f_1$ of mixer 32 will also remain at a predetermined value, regardless of whether $f_0$ remains the same from pulse-to-pulse.

Bandpass filter and IF amplifier 36 permit frequency $f_1$ to pass through the following stage but eliminate frequency $f_2$. Although not essential to the invention, if $f_1$ is a relatively high frequency it may be mixed in mixer 40 with a second frequency $f_3$ from oscillator 38 and then passed through amplifier 42 to obtain a somewhat lower frequency $f_4=f_1-f_3$. Pulses at this lower frequency are detected in detector stage 44 and applied to a presentation unit such as a cathode ray tube indicator and its associated circuits shown as a single block 46. The presentation unit may be any one of a number of well known types as, for example, a so-called plan position indicator (P.P.I.), whereby the detected pulses from detector 44 are applied to intensity modulate the beam of the cathode ray tube indicator.

The components shown in block form in FIGURE 1, except for the programming unit 12, are per se well known in the art. Thus, for example, amplifier 22 may be a klystron or travelling wave tube. Mixer 32 may be a wide-band, low noise travelling wave tube to obtain high receiver sensitivity, eliminate crystal burn out and decrease TR tube requirements. Mixer 40 may comprise a standard crystal mixer. TR device 30 functions to prevent a transmitted pulse from reaching the receiver stages and may consist of any one of a number of such devices which are well known in the art. The pulse modulator may apply pulses of say ¼ to 10 microseconds in width to the oscillator at a rate depending upon the radar range of interest. The rate may, for example, be on the order of from 100 pulses per second to many thousands of pulses per second.

As already mentioned, the function of programming unit 12 is to supply a voltage to oscillator 10 which remains constant over the entire radar range of interest and which then varies to some new value and remains at the new value for the entire time interval between the following transmitted pulse and the following pulse received from the furthest target of interest. The change in voltage output may be according to a predetermined schedule or a random schedule. For military purposes it is preferable that the change be according to a random schedule to further reduce the possibility of jamming. It has been found that changes in frequency output according to a preselected schedule can be decoded by the enemy and the jamming signal then also changed in accordance with the schedule.

The programming unit shown in FIGURE 2 provides a voltage output of the type required according to a random schedule. When triodes 50 and 52 conduct, condenser 54 charges and discharges in accordance with the noise signal applied by source 56 between the cathode and ground of triode 50. The time constants of charging and discharging circuit of condenser 54 must of course be sufficiently fast to permit this type of operation. The size of condenser 54 and the impedances of triode 50 and source 56 determine the charging time constant, and the size of condenser 54 and impedances presented by resistor 55 and triode 52 determine the discharging time constant. Noise source 56 may be any one of a number of well known types and several will be described in greater detail later. A typical noise voltage output wave is shown in FIGURE 3c.

Referring again to FIGURE 2, pulses from modulator 18 are applied to a gating device such as monostable multivibrator 58. The output of the multivibrator consists of a negative-going, gate-pulse having a duration which is equal to the maximum radar range of interest, as shown in FIGURE 3b. The negative-going portion of the gate is of sufficient amplitude to drive both triodes 50 and 52 beyond cutoff. During the interval of time the triodes are cutoff, condenser 54 has no discharge path and accordingly it must remain charged to the same value to which it was charged the instant before tubes 50 and 52 were cutoff. The resultant voltage across condenser 54 is shown in FIGURE 3d. Note that the voltage remains constant between the time of transmission of a pulse and a time equivalent to the furthest radar range of interest. After this last-mentioned time, triodes 50 and 52 are again rendered conductive, whereby the voltage across condenser 54 varies in an absolutely random way until the next negative-going gate is applied to both triodes. The voltage across condenser 54 is amplified in amplifier stage 60 and applied to control the frequency of the tunable oscillator 10 (FIGURE 1).

Figure 4:
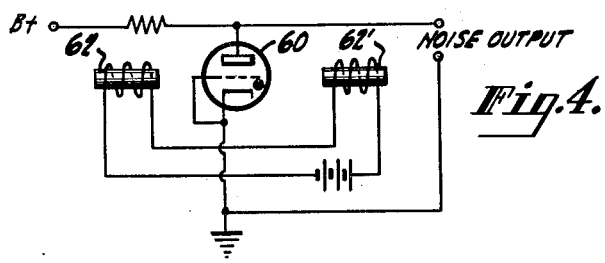
FIGURES 4 and 5 are circuit diagrams of noise generators suitable for use in the programming unit shown in FIGURES 1 and 2.
Figure 5:
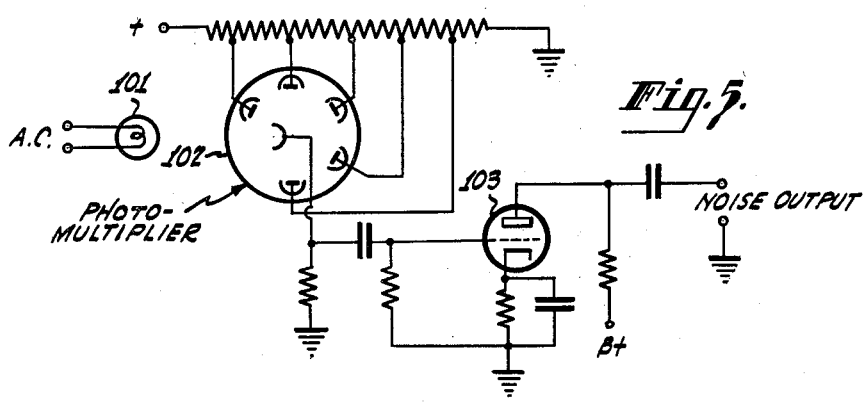

FIGURES 4 and 5 show typical noise generators which may be used in the circuit of FIGURE 2. The one shown in FIGURE 4 includes a thyratron 60, and means including a pair of electromagnets 62, 62' for applying a magnetic field to the thyratron. This generator is described in greater detail in Patent No. 2,624,867, titled Gas Discharge Tube, issued on January 6, 1953, to J. D. Cobine et al.

A photomultiplier noise generator shown in FIGURE 5 operates as follows.

A photomultiplier tube 102 such as the RCA 931A is used as a noise source. Due to its high gain it amplifies shot noise. The latter is derived from amplified voltage spikes which are developed when individual electrons leave the cathode. A light source 101 creates more photoelectrons which provide more D.C. signal and more noise. (The D.C. signal is not used.) Wideband amplifier 103 amplifies the noise signal to the desired power level. A generator generally similar to the one described in brief above is explained in more detail in Patent No. 2,558,337, issued June 26, 1951, to H. A. Chinn.

Figure 6:
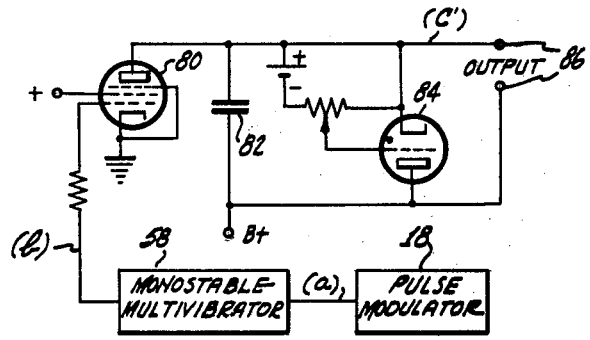
FIGURES 6 and 8 are schematic circuit diagrams of other types of programming units which may be used with the present invention.
Figure 7:
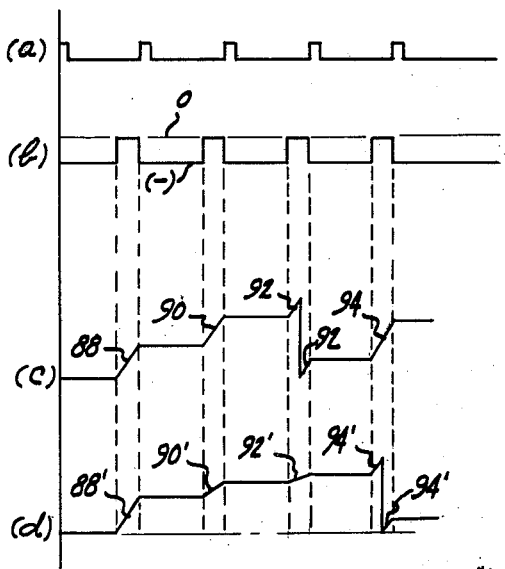
FIGURE 7 is a drawing of waveforms in the circuits shown in FIGURES 6 and 8.

The programming unit shown in FIGURE 6 is a modified relaxation oscillator. The output voltage of this unit varies according to a preselected schedule and accordingly is not as suitable for use in the arrangement of FIGURE 1 as the one shown in FIGURE 2, when the system of FIGURE 1 is being used in military applications. The saw tooth generator, per se, is of a well known type. It includes a normally conducting pentode 80 and charging capacitor 82 effectively connected in series. The condenser charges toward the B plus voltage. If the tube is maintained conducting, the control grid of thyratron 84 shortly reaches its firing potential, whereby the thyratron conducts, and the storage capacitor discharges through the thyratron. This gives the normal saw tooth voltage output wave at terminal 86. The circuit is modified for use in the present invention by applying a negative gate pulse $b$ from multivibrator 58 to the control grid of the pentode. The gate duration is equal to the entire radar range of interest and the gate is sufficiently negative to drive pentode 80 beyond cutoff. When the pentode is cutoff, capacitor 82 cannot charge through the pentode and, since the thyratron is also effectively an open circuit it cannot discharge through the thyratron. Accordingly, the voltage is on the condenser immediately prior to the application of negative gate to the pentode, remains at the same value for the duration of the gate. The resultant voltage $c'$ is shown in FIGURE 7c. It should be noted that since the charging time constant for condenser 82 remains constant, the slopes of portions 88, 90, 92, and 94 of the curve are equal. The output frequency of the system which results will change from one transmitted pulse to the next according to a predetermined schedule.

Figure 8:
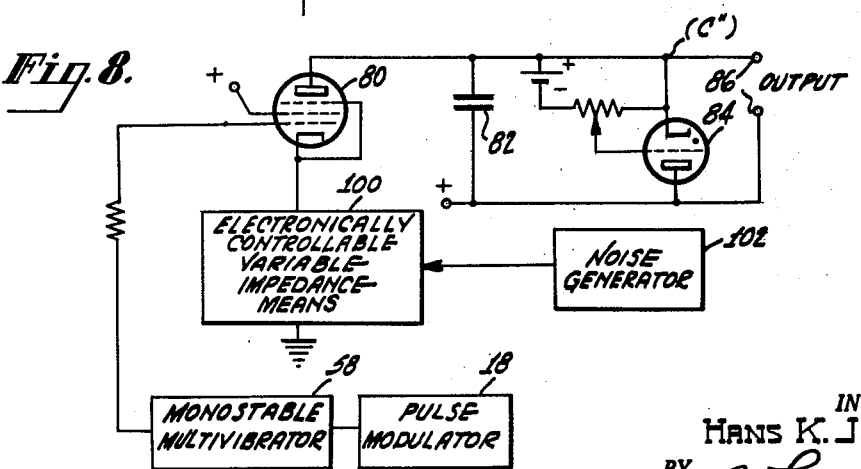

The circuit of FIGURE 6 may be modified in the manner shown in FIGURE 8 to provide a more random output wave. The modification includes an electronically controllable, variable impedance means in series between the cathode of the pentode and ground, and a noise generator 102 for controlling the impedance presented by the impedance means. Variable impedance means 100 may, for example, comprise an electron discharge device such as a triode, whereby the noise voltage is applied in the grid-to-cathode circuit of the triode. More details of an arrangement of this type may be found in Patent No. 2,321,269, titled Frequency Modulation, issued on June 8, 1943, to M. Artzt.

In the circuit of FIGURE 8, since there is a constantly varying impedance in series with the charging path of condenser 82, the latter does not charge according to a fixed law. The resultant output wave $c''$ from the programmer is as shown in FIGURE 7d''. The sections 88', 90', 92' and 94' of the wave are all of different slopes. Accordingly, the frequency transmitted from the system of FIGURE 1 will not vary according to a preselected schedule but will be quite random. The portions 88', 90', etc., of the wave of FIGURE 7d'' are shown as straight lines for the sake of drawing simplicity, however, they generally will be curved.

What is claimed is:

1. A radar system comprising, in combination, means for radiating carrier frequency pulses; means for maintaining the carrier frequency of said pulses substantially constant for the duration of each pulse; means for randomly changing the carrier frequency of said pulses from pulse-to-pulse; and means for receiving and displaying said pulses after reflection from reflecting objects.

2. A radar system comprising, in combination, means including a voltage tunable oscillator for generating and radiating carrier frequency pulses; means for maintaining the frequency of said oscillator substantially constant during the pulse intervals, comprising means for maintaining voltage applied to said oscillator constant during said intervals; means including a noise generator for randomly varying the voltage applied to said oscillator, for changing the carrier frequency of said pulses from pulse-to-pulse; and means for receiving and displaying said pulses after reflection from reflecting objects.

3. A radar system comprising, in combination, means including a voltage tunable oscillator for generating and radiating carrier frequency pulses; means for maintaining the frequency of said oscillator substantially constant during the pulse intervals, comprising means for maintaining the voltage applied to tune said oscillator constant during said intervals; means for changing the carrier frequency of said pulses from pulse-to-pulse, including a noise generator for changing the voltage applied to tune said oscillator in a random manner during each period between the time equivalent of the furthest radar range of interest and the time at which a pulse is radiated; and means for receiving and displaying said pulses after reflection from reflecting objects.

4. A radar system comprising, in combination, means for generating and radiating carrier frequency pulses including a voltage tunable oscillator; means for maintaining the frequency of said oscillator substantially constant during the pulse intervals comprising means for maintaining the voltage applied to tune said oscillator constant during said intervals; means for changing the carrier frequency of said pulses from pulse-to-pulse, including means for changing the voltage applied to tune said oscillator during each period between the time equivalent of the furthest radar range of interest and the time at which a pulse is radiated; and means for receiving said pulses after reflection from reflecting objects.

5. A radar system as set forth in claim 4, wherein said oscillator comprises a voltage tunable magnetron.

6. A radar system as set forth in claim 4, wherein said oscillator comprises a backward-wave oscillator.

7. A radar system as set forth in claim 4, wherein said means for generating and radiating carrier frequency pulses includes a continuous-wave, voltage tunable oscillator common to both the transmitting and receiving channels of said radar system, a pulsed oscillator, and mixer means for mixing the output of said continuous wave oscillator and said pulse oscillator to derive therefrom a beat frequency signal, the radiated carrier frequency pulses comprising pulses, the carrier frequency of which is equal to said beat frequency.

8. A radar system comprising, in combination, transmitter means; receiver means; a continuous wave oscillator common to both of said means; a pulsed beat-frequency oscillator; means for mixing the output of said pulsed and continuous wave oscillators for producing beat-frequency pulses; means for radiating said beat-frequency pulses and receiving them after reflection from reflecting objects; and means in said receiver means for mixing said received, beat-frequency pulses with the output of said continuous wave oscillator to obtain resultant pulses having a carrier frequency which is the same as the frequency of the oscillations produced by said pulsed oscillator.

9. A radar system comprising, in combination, transmitter means; receiver means; a continuous-wave oscillator common to both of said means; a pulsed beat-frequency oscillator; means for mixing the output of said pulsed and continuous-wave oscillators for producing beat-frequency pulses; means for radiating said beat-frequency pulses and receiving them after reflection from reflecting objects; means in said receiver means for mixing the received, beat-frequency pulses with the output of said continuous wave oscillator to obtain resultant pulses having a carrier frequency which is the same as that of said pulsed oscillator; means for maintaining the frequency output of said continuous wave oscillator at a fixed value during each interval between the transmission of a pulse and the reception of an echo from the furthest object of interest; and means for changing the frequency output of said continuous wave oscillator between successive ones of said intervals, whereby the carrier frequency of succeeding ones of said radiated pulses is different.

10. A radar system as set forth in claim 9, wherein said continuous-wave oscillator comprises a voltage tunable oscillator, and said means for changing the frequency of said continuous-wave oscillator includes means for randomly changing said frequency.

11. A radar system as set forth in claim 10, wherein the last-mentioned means includes a noise generator.

12. A radar system as set forth in claim 10, wherein the last-mentioned means includes a relaxation oscillator.

13. A radar system comprising, in combination, a main oscillator for producing a signal; means including a second oscillator for deriving from said signal a beat-frequency signal; means for intermittently radiating said beat-frequency into space and receiving echo signals reflected from objects in the path of the radiated signal; means including said main oscillator for deriving from said echo signals fixed frequency signals at the frequency of said second oscillator; means coupled to said main oscillator for maintaining its output frequency at a constant value during each interval between the radiation of a signal and the reception of an echo from the furthest object of interest; and means for changing the output frequency of said oscillator to a different value for succeeding ones of said intervals.

14. A radar system as set forth in claim 13, wherein said main oscillator comprises a continuous-wave oscillator and said second oscillator comprises a pulsed oscillator.

15. A radar system as set forth in claim 13, wherein said means for changing the frequency of said main oscillator includes means for effecting such change in a non-predictable manner.

16. A radar system comprising, in combination, a main oscillator; means for deriving from the main oscillator frequency a signal at a beat frequency; means for radiating energy at said beat frequency and receiving echoes from objects which reflect said energy; means for deriving from said received echoes and the output of said main oscillator a beat frequency signal of fixed frequency, regardless of the frequency to which said oscillator is tuned; and means for maintaining said oscillator frequency at one value for the entire interval of time between the transmission and reception of energy and for then changing said oscillator frequency to a new value substantially widely spaced from said one value.

17. The invention according to claim 16 wherein said last means includes a storage capacitor, a charging circuit connected in shunt across said capacitor whereby a voltage appears thereacross for controlling the frequency of said main oscillator, a discharging circuit connected in shunt across said capacitor, switch means in each of said circuits for normally maintaining said circuits closed, a random signal source in said charging circuit for charging said capacitor in accordance with the signal output thereof, and means for opening said switch means whereby the instantaneous charge on said capacitor at the instant said switch means are opened is maintained at its value at that instant.

18. A radar system comprising, in combination, means for radiating carrier frequency pulses toward an object; means for maintaining the carrier frequency of said pulses substantially constant for the duration of each pulse; means for randomly changing the carrier frequency of said pulses from pulse-to-pulse; and means for receiving pulses from said object in response to said radiation.

19. A radar system comprising, in combination, means including a voltage tunable oscillator for generating and radiating carrier frequency pulses toward an object; means for maintaining the frequency of said oscillator substantially constant during the pulse intervals, comprising means for maintaining voltage applied to said oscillator constant during said intervals; means including noise genertor for randomly varying the voltage applied to said oscillator, for changing the carrier frequency of said pulses from pulse-to-pulse; and means for receiving pulses from said object in response to said radiation.

20. A radar system comprising means for transmitting carrier frequency signal in the form of pulses, said means including a main oscillator which may be variable in frequency and which is utilized in determining the carrier frequency of said pulses, means for receiving the pulse signals which are returned to said system in response to the transmission of said pulses, said receiving means including a first mixer to which said received pulses are to be applied for obtaining an intermediate frequency signal as the output of said mixer, a second oscillator for supplying signal at said intermediate frequency, a second mixer, means supplying to said second mixer both signal from said main oscillator and signal from said second oscillator whereby there is obtained a signal differing in frequency from that of said main oscillator signal by an amount equal to said desired intermediate frequency, and means including said receiving means for supplying to said first mixer both signal at said second mixer output frequency and signal at the frequency of said main oscillator, one of said signals supplied to said first mixer being the received signal, whereby a signal at said intermediate frequency appears at the output of said first mixer.

21. The invention according to claim 20 wherein means is provided for maintaining the carrier frequency of said pulses substantially constant for the duration of each pulse, and wherein further means is provided for randomly changing the carrier frequency of said pulses from pulse-to-pulse.

22. A radar system comprising, transmitting means for transmitting carrier frequency pulses, superheterodyne receiving means including a first mixer, said transmitting means including a main oscillator which may be variable in frequency and which is utilized in determining the carrier frequency of said transmitted pulses, a second mixer, a stable oscillator operating at the desired intermediate frequency for said receiver, means supplying to said second mixer both signal from said stable oscillator and signal from said main oscillator whereby the output of said second mixer contains a signal differing in frequency from that of said main oscillator signal by an amount equal to said desired intermediate frequency, and means including said receiving means for supplying to said first mixer both signal at said second mixer output frequency and signal at said main oscillator output frequency, one of said last mentioned signals being the received signal, whereby signal at said desired intermediate frequency appears in the output of said first mixer regardless of the operating frequency of said main oscillator.

References Cited in the file of this patent
UNITED STATES PATENTS

| 2,461,144 | Cook | Feb. 8, 1949 |
|---|---|---|
| 2,490,808 | Hoffman | Dec. 13, 1949 |
| 2,522,367 | Guanella | Sept. 12, 1950 |
| 2,589,807 | Higinbotham | Mar. 18, 1952 |
| 2,603,744 | Larson | July 15, 1952 |
| 2,671,896 | De Rosa | Mar. 9, 1954 |
| 2,725,555 | Hopper | Nov. 29, 1955 |
| 2,856,600 | Clevenger | Oct. 14, 1958 |